HUB AND REEL CONSTRUCTION

Filed Oct. 31, 1966 2 Sheets-Sheet 1

Inventor:
Arnold P. Hultgren
By Bair, Freeman & Molinare
Attys.

Inventor:
Arnold P. Hultgren
By Bair, Freeman & Molinare
Attys.

United States Patent Office 3,485,457
Patented Dec. 23, 1969

3,485,457

HUB AND REEL CONSTRUCTION

Arnold P. Hultgren, River Forest, Ill., assignor to Amerline Corporation, a corporation of Illinois Filed Oct. 31, 1966, Ser. No. 590,791
Int. Cl. B65h *75/18*
U.S. Cl. 242—71.8 10 Claims

ABSTRACT OF THE DISCLOSURE

A hub for a reel for storing magnetic tape. The hub is made of a molded plastic and includes a ring like metal reinforcing insert molded within the plastic hub. The coefficient of expansion of the plastic hub containing the metal insert is substantially equal to the coefficient of expansion of the tape.

This invention relates to a novel tape reel and particularly to a novel hub construction for a reel for storing magnetic tape used with computers.

The construction of most magnetic tape reels used today comprises a central metallic hub, generally aluminum, and a pair of spaced flanges having inwardly directed connecting portions secured to the opposite sides of the hub and to each other for defining a tape receiving space therebetween. Heretofore, it has been considered necessary to construct the central hub of metal so that it can withstand compression forces imparted to the hub from the tape wound around the hub, since as more tape is wound around the hub, the greater is the compression force that is imparted to the hub. One of the significant disadvantages involved in the use of a metal hub for the tape reel is the excessive expense involved in constructing the heavy metal hub, from the standpoint of both material costs and labor costs. A further disadvantage in the use of metal hubs is that, when the tape and the reel are exposed to excessively cold temperatures, the magnetic tape wound upon the hub becomes taut or stretches since the coefficient of contraction of a metal hub is significantly less than the coefficient of contraction of the magnetic tape wound on the hub. This can cause stretching of the tape which is considered to be highly undesirable because such tape distortion may result in errors in information transfer between the tape and the computer.

A plastic hub for tape reels overcomes certain of the disadvantages of a metal hub, and particularly the cost problem. The material cost of a plastic hub is significantly less than that of a metal hub and also there is far less machining involved with a plastic hub since the plastic hub may be molded to substantially the desired dimensions. Also, since the flanges of magnetic tape reels are generally of molded plastic construction, by having plastic hubs, it is possible to more economically bond the flanges to the hub. Another advantage of all plastic hubs is that plastic flanges are joined directly to a plastic hub. Thus, the hub and flanges expand and contract at substantially the same rate. In this way, there would be little if any distortion of the flanges resulting from differences in expansion or contraction between the flanges and the hub to which they are joined. It is very important that the flanges of a magnetic tape reel be maintained substantially parallel to avoid damage to the edges of the tape and a construction which avoids flange distortion fulfills a very important requirement. Another advantage of a plastic hub over a metal hub is that when a solid flange reel is used it is difficult to start the tape because there are no finger holes. With a plastic hub, however, there is a tendency for the tape to adhere to the hub through electrostatic attraction.

One problem with using plastic hubs, however, as previously suggested is that a plastic hub is not able to withstand the compression forces imparted to the hub by the wound tape. Furthermore, plastic hubs have a greater coefficient of contraction than the tape so that when the tape and the reel are exposed to cold, the plastic hub contracts more than the tape. The tape thereby becomes loose on the hub. This is as undesirable a situation as when the tape becomes stretched on the hub since the tape may become creased when loose on the hub and the creasing of tape also adversely affects the transfer of information between the tape and the computer.

It has been suggested that one way to overcome certain of the disadvantages of metal hubs or plastic hubs is to provide a glass resin hub or a glass filled plastic hub. Such hubs would have the strength required to withstand the compression forces of the tape wound around the hub and they would also be more economical to manufacture than metal hubs. However, the use of these glass hubs with magnetic tape is considered to be very undesirable. It is very important that magneitc tape be maintained in a clean, dust free condition. Even minute particles on the tape can cause serious problems in reading of the tape by the computer. It is for this reason that magnetic tape reels are stored in dust free containers. Glass resin hubs are highly undesirable since minute glass particles become loose from the hub and are likely to contact or become embedded on the tape. These glass particles would create even more serious problems than dust since the glass particles have a tendency to cut the tape. Also, the coefficient of contraction of glass resin hubs is generally less than tape so the tape would become taut on the hub.

Still another construction which has been used for tape reels is made by molding an all plastic hub and then press fitting a heavy metal ring onto the hub for the purpose of rigidifying the hub. However, this construction is very expensive and does not overcome the problem of the tape becoming loose or taut on the hub because of the difference in the coefficient of expansion of the tape and the hub. Thus, this construction is not satisfactory.

A further tape reel structure uses a heavy metal ring which is molded unitary with a portion of the hub. In this structure, however, only the outer periphery of the ring is joined to the hub while the inner periphery and annular sides of the ring are fully exposed. Again, this structure is unsatisfactory because it is quite expensive and it does not overcome the problems associated with the differences in the coefficient of expansion between metal, plastic, and magnetic tape.

It is therefore an important object of this invention to provide a unique hub for a magnetic tape reel wherein disadvantages of known reel hub constructions including all plastic hubs, all metal hubs, and glass resin hubs are substantially avoided.

It is also an object of this invention to provide a novel tape reel hub which has substantially the same coefficient of contraction (or expansion) as the magnetic tape which is stored on the hub to thereby avoid the undesirable situation of the tape becoming loose or stretched on the hub.

It is a further object of this invention to provide a novel tape reel hub which is characterized by its strength and economy in manufacture.

It is yet another object of this invention to provide a unique tape reel hub which is made of molded plastic having a metal insert embedded therein so as to substantially overcome the disadvantages of all previously known hub constructions used for tape reels.

It is yet a further object of this invention to provide a tape reel structure wherein an annular plastic hub is secured to a plastic hub with a metal insert so as to provide a tape reel for magnetic tape which is substantially free of distortions.

It is also another object of this invention to provide a tape reel structure wherein the tape reel flanges are maintained substantially parallel at all times since the structure provides plastic flanges joined to a plastic hub and yet the hub is of sufficient strength to withstand compressive forces of the wound tape.

Further purposes and objects of this invention will appear as the specification proceeds.

A particular embodiment of the present invention is illustrated in the accompanying drawings wherein.

Referring to FIGURES 1–8, my unique tape reel construction 10 comprises a novel central hub 12 and a pair of substantially parallel and planar or flat annular flanges 14 which are mounted on the opposite sides of the hub 12.

Figures 1, 2, 3, 4, 5, 6, 7, 8:
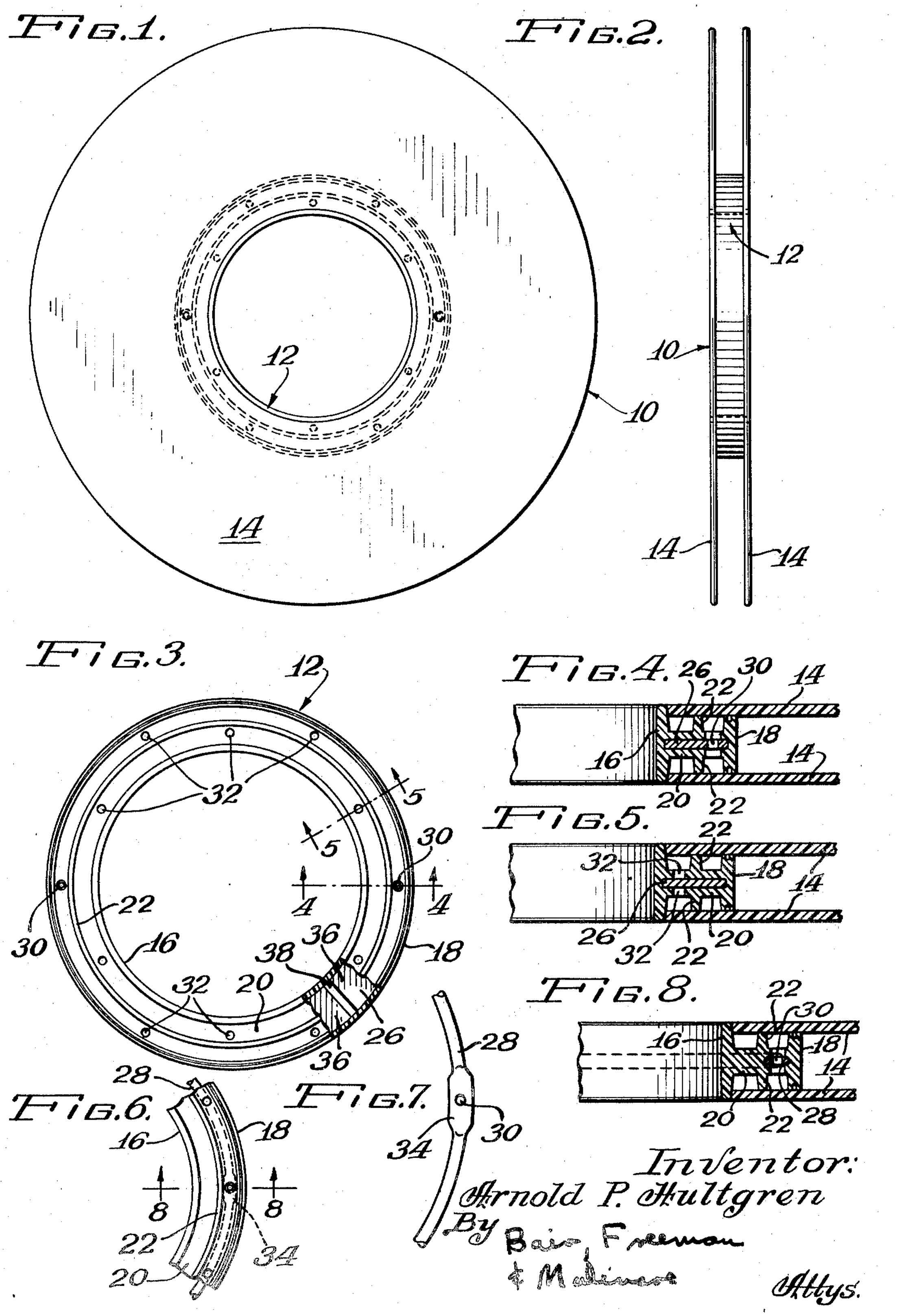
FIGURE 1 is a top plan view of my novel tape reel using my novel tape reel hub.
FIGURE 2 is an end elevational view of the tape reel of FIGURE 1.
FIGURE 3 is a top plan view of the hub only of the embodiment of FIGURE 1.
FIGURE 4 is a cross-sectional view through the hub of FIGURE 3 taken along the line 4—4 of FIGURE 3.
FIGURE 5 is a cross-sectional view of the hub of FIGURE 3 taken along the line 5—5 of FIGURE 3.
FIGURE 6 is a fragmentary top plan view of an alternate embodiment of my tape reel hub.
FIGURE 7 is a detailed top plan view of the form of metal insert which is used in the embodiment of the hub of FIGURE 6.
FIGURE 8 is a cross-sectional view through the hub of FIGURE 6 taken along the line 8—8 of FIGURE 6.

One embodiment of my novel hub construction 12 is shown in detail in FIGURES 3–5. The hub 12 has an inner substantially cylindrical rim 16 and an outer substantially cylindrical rim 18. A continuous web 20 joins the central portion of the inner rim 16 to the central portion 18 to form an integral structure. Upright ribs 22 are interposed between the ribs 16 and 18 and extend laterally from and are integral with the web 20. The ribs 22 are substantially parallel to the inner and outer rims 16 and 18. The hub 12 is molded of suitable plastic materials such as acrylonitrile, high impact styrene, clear styrene, ABS, polycarbonate and the like.

The important aspect of my invention requires the use of a metal insert 26 embedded within the hub 12 during molding. In the form of the invention shown in FIGURES 3–5, the insert 26 is flat metal ring. The ring-like insert 26 is enclosed within the web 20 and, in cross-section, extends between the inner and outer rims 16 and 18. The metal insert 26 provides the necessary strength so that the hub 12 is able to withstand the compressive forces of the wound tape. The metal insert in combination with the molded plastic mass of the hub also provides the important characteristic of the hub having substantially the same coefficient of contraction as the tape.

Although the insert 26 may have portions of its annular sides exposed, that is, not enclosed by plastic, it is important that the inner and outer edges of the annular insert 26 be substantially covered by the plastic hub 12. In this way, the metal insert 26 provides the necessary rigidification for the plastic hub 12, while at the same time providing, in combination with the plastic hub, a coefficent of expansion or contraction which is substantially equal to the magnetic tape on the hub.

The metal insert may be in a variety of shapes. The embodiment of FIGURES 6–8 is a metal wire insert 28 having a circular cross-section. The insert may be made of spring wire. In this embodiment, the wire insert 28 is located in the web 20, but is preferably closer to the outer rim than to the inner rim 16.

In molding a plastic hub 12 containing a metal insert 26 or 28, the insert must be properly located within the mold so that it is centrally located within the web 20 of the hub 12. The proper location of the insert is accomplished, for example, by the use of pins in the mold. A pair of spaced apertures 30 are provided in the flat metal insert 26 as shown in FIGURES 3 and 4. The apertures 30 engage pins in the mold so as to properly locate the insert 26 with respect to the inner and outer rims of the hub 12. Also, as seen in FIGURES 3 and 4, a plurality of openings 32 are seen in the plastic portion only of the web 20. These openings are the result of the metal insert 26 being held between pins in the mold to provide proper alignment relative to the opposite sides of the hub. The apertures 30 in the insert and the openings 32 in web 20 thereby have no function after molding and are used only to properly locate the insert within the hub. As seen in FIGURES 7 and 8, when circular cross-section wire inserts 28 are utilized, spaced portions 34 on the wire 28 are flattened so that an aperture 30 may be provided therein and properly locate the insert 28 within the mold.

The ring-like insert 26 or 28 may be continuous or discontinuous so that the ends thereof actually do not meet, as seen in FIGURE 3. A space 38 between the ends 36 of the ring-like insert 26, for example, has been found to be particularly satisfactory. When the space 38 is used in the insert, the coefficient of contraction or expansion of the hub and the insert combination will more closely equal the coefficient of contraction or expansion of the magnetic tape.

Since a considerable quantity of scrap is created by machining when a flat metal insert 26 is used, the wire insert 28 is preferably utilized since there is practically no scrap so that such an insert is very economical. Although the cross-section of the wire 28 is shown to be circular, it may have practically any shape, including square, rectangular, oval, or the like.

The flanges 14 are secured to the opposite sides of the hub 12 by any suitable means. One preferred way to accomplish this is to sonically seal or solvent seal the flat, annular flanges to the outer edges of ribs 22 and outer rim 18, as shown in FIGURES 4, 5, and 8 to provide a highly economical structure. The inner rim 16 extends beyond the outer rim 18 and ribs 22 so that the inner rim 16 actually acts as a centering guide for the central aperture of the annular flat flanges 14. The outer edges of the inner rim 16 are coextensive with the outer surfaces of the flanges 14 while the outer edges of the ribs 22 and outer rim 18 abut the inner surface of the flanges 14. Also, since plastic flanges are joined directly to the plastic surfaces of the hub, the coefficients of expansion of the flanges and hub at the place of joining are substantially equal. Thus, substantially no distortions are imparted to the flanges and the flanges will be maintained substantially parallel at all times.

As previously set forth, one of the important design features of my invention is that the coefficient of contraction or of expansion of the hub with the metal insert therein is to be substantially equal to the coefficient of contraction or of expansion of the magnetic tape which is wound around the hub. FIGURES 9–17 illustrate a series of tests which indicate that the plastic hub with a metal insert has a coefficient of contraction which comes quite close to that of magnetic tape.

The tests of FIGURES 9–12 constitute a series of graphs comparing the diameter of various tape reel hubs at various temperatures from room temperature, down to a temperature of −50° F. The hubs which were tested included glass filled nitrile hubs, glass filled ABS hubs, ABS hubs, and acrylonitrile hubs. Some of the hubs use steel or aluminum inserts while some were not so reinforced. The metal inserts used in the tested hubs had a nominal inside diameter of 3⅞ inches, a nominal outside diameter of 4½ inches, and a nominal thickness of 1/16 inch. The tested hubs had the general configuration shown in the drawings and had a nominal outside diameter of 4¾ inches, a nominal inside diameter of 3 11/16 inches, and a thickness of 11/16 inch. Some of the metal inserts were continuous while others were discontinuous and had an eighth inch slot or quarter inch slot therein.

It is to be understood that the various combinations of metal inserts with various plastics to be described hereinafter relative to FIGURES 9–12 are merely illustrative of certain advantages of my invention. The invention is not intended to be limited in any way to the use of a particular plastic with a particular metal insert. The graphs illustrate that the coefficient of contraction for a hub most closely approximates that of magnetic tape when a plastic hub with a metal insert is utilized.

Figures 9, 10:
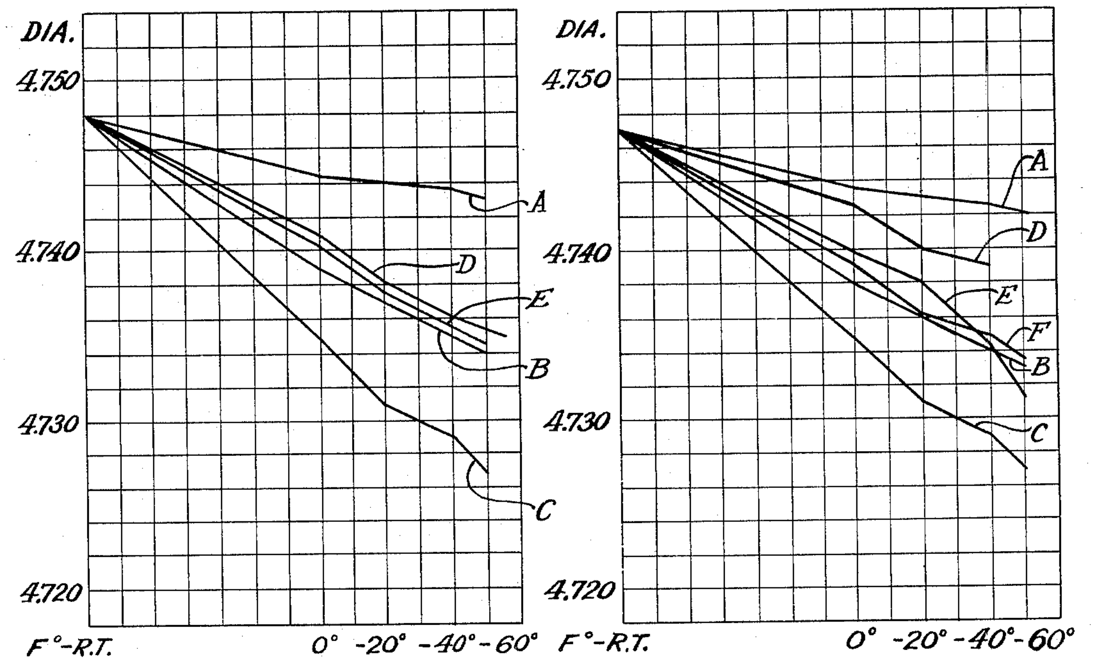
FIGURE 9 is a graph comparing the contraction of various types of hubs with the contraction of magnetic tape.
FIGURE 10 is another graph comparing the contraction of various types of hubs with the contraction of magnetic tape.

In FIGURE 9, line A represents the contraction of an aluminum hub and line B represents the contraction of the inside diameter of a magnetic tape wound about a specially constructed hub which supports the tape but which does not resist tape contraction. The tape is shown with its inside diameter at various temperatures while the hubs are shown with their outside diameters at various temperatures. In this figure and in all subsequent figures, it is seen that the aluminum hub contracts much less than magnetic tape so that when using an aluminum hub, the tape would become stretched around the hub as the temperature decreases. Line C in FIGURE 9 shows the contraction of an all plastic hub made by acrylonitrile without the use of any insert, and it is seen that the plastic contracts more than magnetic tape so that the tape would become loose upon an all plastic hub as temperature decreases. Lines D and E represent the contraction of hubs made in accordane with my invention, the hubs having a coefficient of expansion or of contraction which approximates that of the tape. Line D represents an acrylonitrile hub with a continuous aluminum insert and line E represents the contraction of a hub made of acrylonitrile with a discontinuous aluminum insert, having a ⅛ inch slot therein.

FIGURE 10 further illustrates advantages of the invention. Line A represents the contraction of an aluminum hub, line B represents the contraction of the tape, and line C represents the contraction of an acrylonitrile hub without the use of a metal insert. Line D illustrates the contraction of an acrylonitrile hub having a continuous steel insert. Line E represents the contraction of an acrylonitrile hub with a discontinuous steel insert having a ⅛ inch slot therein. Line F illustrates the contraction of an acrylonitrile hub with an aluminum insert having a ⅛ inch slot therein. It is again seen that plastic hubs with metal inserts therein, particularly the acrylonitrile hub with an aluminum insert having a ⅛ inch slot, have coefficients of contraction which closely conform to that of magnetic tape.

Figures 11, 12:
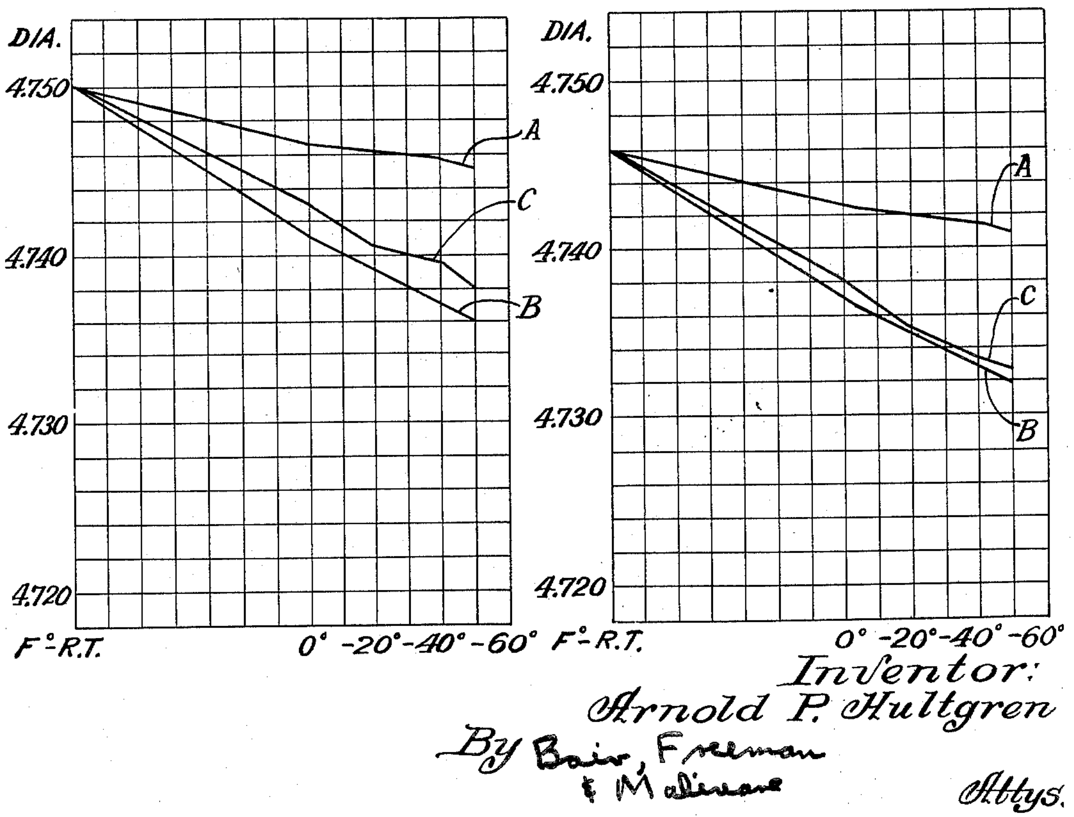
FIGURE 11 is still another graph comparing the contraction of various types of hubs with the contraction of magnetic tape.
FIGURE 12 is another graph comparing the contraction of various types of hubs with the contraction of magnetic tape.

In FIGURE 11, line A represents the contraction of an aluminum hub, line B represents the contraction of magnetic tape, and line C represents the contraction of a high impact styrene hub having a continuous aluminum insert. The plastic hub with the aluminum insert again conforms closely to the coefficient of contraction of the magnetic tape.

In FIGURE 12, line A represents the contraction of an aluminum hub, line B represents the contraction of magnetic tape, and line C represents the contraction of a high impact styrene hub having a discontinuous aluminum insert, wherein the aluminum insert has a ⅛ inch slot therein. Again, the plastic hub with the metal insert has a coefficient of contraction which conforms to the coefficient of contraction of the magnetic tape.

It is seen from the foregoing examples that by a proper selection of a plastic material for a hub, insert material, and conformation and dimensions of the hub and insert, my invention surprisingly provides a hub whose outside diameter contracts at substantially the same rate as the magnetic tape which is wound about such a hub. Also, in the foregoing examples, the same magnetic tape was tested. Since not all magnetic tape have the same coefficient of expansion or contraction, different combinations of hubs and inserts may be desirable. By routine testing, however, the proper plastic, dimensions, and conformation can be selected for a hub and the proper metal, dimensions, and conformation can be selected for the insert so as to provide a hub construction which expands and contracts at substantially the same rate as the tape which is wound therearound. My novel hub construction also avoids the formation of glass particles which can come in contact with the tape, as found with glass resin hubs, and yet it has the necessary strength to withstand the compressive force of tape wound about the hub. A further advantage is found in constructing my reel, since the reel flanges may be mounted to the hub economically and the flanges of the reel will remain substantially parallel since they are substantially distortion free. My hub and reel are of an overall economical construction. It is therefore seen that I have accomplished all of the foregoing objects of my unique reel and hub construction.

What I claim and desire to secure by Letters Patent is:

1. In combination, a reel, magnetic tape on said reel, said reel comprising a molded plastic central hub member having said tape wound therearound, a ring-like metal reinforced insert molded within said plastic hub member, the coefficient of expansion of the said plastic hub containing the said metal insert being substantially equal to the coefficient of expansion of said tape, and a pair of substantially planar annular flanges joined to the opposite sides of said hub member and having said tape positioned therebetween.

2. In combination, a reel, magnetic tape on said reel, said reel comprising a molded plastic central hub member having an inner rim, an outer rim and a web joining said rims, a ring-like metal reinforcing insert contained within said web, the coefficient of expansion of said plastic hub member containing the said metal insert being substantially equal to the coefficient of expansion of said tape and pair of substantially planar annular flanges joined to the opposite sides of said hub member and having said tape positioned therebetween.

3. The combination of claim 1 wherein said ring-like insert is substantially covered on its inner and outer edges by the plastic of said hub member.

4. The combination of claim 3 wherein said metal insert is in the form of a continuous ring.

5. The combination of claim 3 wherein said metal insert is in the form of a discontinuous ring.

6. The combination of claim 2 wherein said insert is flat and rectangular in cross-section and extends between said rims.

7. The combination of claim 2 wherein said metal insert is circular in cross-section and is located in closer proximity to said outer rim than to said inner rim.

8. The combination of claim 1 wherein the plastic material for said hub is ABS, acrylonitrile, polycarbonate, or styrene and said metal insert is aluminum or steel.

9. The combination of claim 1 wherein said ring-like insert is substantially covered on all sides by the plastic of said hub.

10. The combination of claim 1 wherein said ring-like insert is substantially covered on at least three of its sides by the plastic of said hub.

References Cited

UNITED STATES PATENTS

| | | | |
|---|---|---|---|
| 2,448,242 | 8/1948 | Wilson | 242—118.31 |
| 3,048,197 | 8/1962 | Fink | 242—118.32 X |
| 3,327,960 | 6/1967 | Hedin. | |

OTHER REFERENCES

Morhard: German printed application No. 1,024,343, dated February 1958.

NATHAN L. MINTZ, Primary Examiner